United States Patent
Quan

(10) Patent No.: US 7,050,698 B1
(45) Date of Patent: May 23, 2006

(54) METHOD AND APPARATUS FOR SYNTHESIZING OR MODIFYING A COPY PROTECTION SIGNAL USING A LOWERED SIGNAL LEVEL PORTION

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 1135 days.

(21) Appl. No.: 09/639,452

(22) Filed: Aug. 15, 2000

(51) Int. Cl.
*H04N 11/00* (2006.01)
*H04N 5/91* (2006.01)
*H04N 7/167* (2006.01)

(52) U.S. Cl. .................. 386/1; 386/94; 386/203; 386/204; 386/224; 380/203; 380/204; 380/224

(58) Field of Classification Search .................... 386/1, 386/94, 95, 96; 380/201, 203, 204, 15
See application file for complete search history.

(56) References Cited

U.S. PATENT DOCUMENTS

| | | | | |
|---|---|---|---|---|
| 4,907,093 A | * | 3/1990 | Ryan | 386/94 |
| 4,924,498 A | * | 5/1990 | Farmer et al. | 380/222 |
| 5,194,965 A | * | 3/1993 | Quan et al. | 386/94 |
| 5,252,041 A | | 10/1993 | Greenberg | |
| 5,748,733 A | * | 5/1998 | Quan | 380/204 |
| 5,844,988 A | * | 12/1998 | Ryan et al. | 380/218 |
| 5,883,959 A | * | 3/1999 | Kori | 380/203 |
| 6,002,830 A | * | 12/1999 | Quan | 386/1 |
| 6,058,191 A | * | 5/2000 | Quan | 380/203 |
| 6,173,109 B1 | * | 1/2001 | Quan | 386/1 |
| 6,188,832 B1 | * | 2/2001 | Ryan | 386/94 |
| 6,516,132 B1 | * | 2/2003 | Wrobleski et al. | 386/1 |

FOREIGN PATENT DOCUMENTS

| | | |
|---|---|---|
| EP | 0771108 | 5/1997 |
| WO | 99 44365 | 9/1999 |

* cited by examiner

*Primary Examiner*—James J. Groody
*Assistant Examiner*—Jamie Vent
(74) *Attorney, Agent, or Firm*—George B. Almeida

(57) ABSTRACT

A modified Colorstripe™ copy protection process utilizes a basic anti-copy protection (ACP) signal that causes attenuation of a video signal, wherein, in one embodiment, the process modifies (lowers) the level of a front porch portion and adds an incorrect color signal (color burst) in the region of the sync tip. When an illegal copy is made, a pre-blanked end of line portion causes a TV set to trigger the color burst sample pulse ahead of time and cause the incorrect color signal in the sync tip region to be sampled. Thus, since the sync tip region has incorrect color phase or frequency, the resulting illegal copy will have enhanced color distortions. In other embodiments, other portions of the horizontal blanking interval are lowered in level and incorrect color bursts are added to a portion or portions of the back porch and/or a portion of the front porch.

A further embodiment employs lowering a back porch portion above a sync tip level near the beginning of a video line to form a pseudo sync/AGC pulse pair. The various embodiments of the process may include an adaptable process, as well as several alternative ACP signals for use in combination with the process.

42 Claims, 6 Drawing Sheets

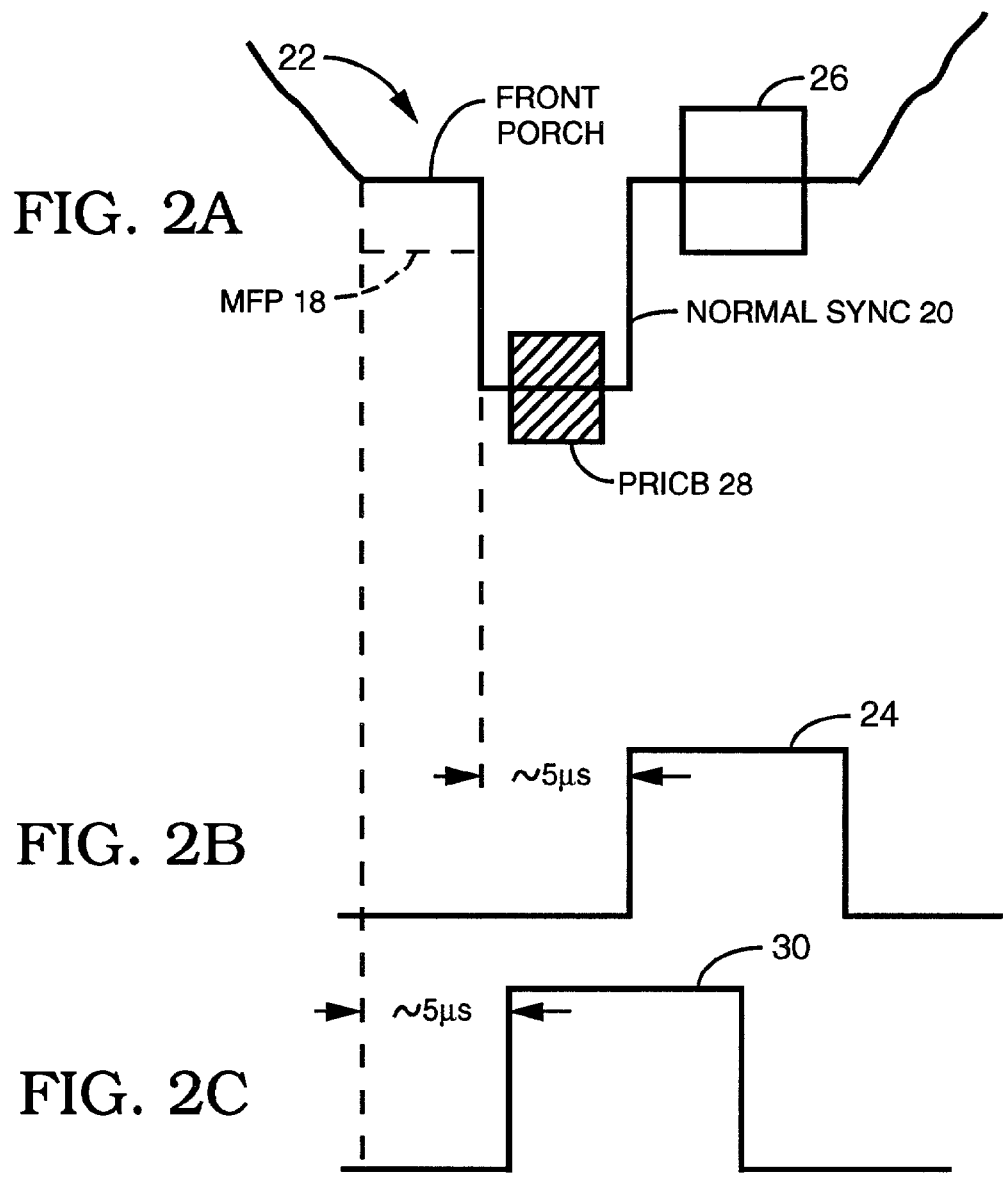

METHOD AND APPARATUS FOR SYNTHESIZING OR MODIFYING A COPY PROTECTION SIGNAL USING A LOWERED SIGNAL LEVEL PORTION

BACKGROUND OF THE INVENTION

The present invention is related to copy protection processes such as those which cause a darkening or lightening effect in an illegal copy of a video signal when displayed, and more particularly to a copy protection process which enhances the copy protection effect by adding further chroma distortion to an illegal copy of the copy protected video signal.

It follows therefore that a preferred embodiment of the invention is used in combination with typical copy protection processes which selectively attenuate the video signal. Such video copy protection signals typically may consist of sync or pseudo sync and automatic gain control (AGC) pulses. In a video cassette recorder (VCR), erroneous gain levels are generated by the sync and/or pseudo sync/AGC signals, which cause the VCR to turn down the video gain. Once the video gain is turned down, a number of enhancement signals may be added primarily to affect the integrity of the sync signal in the VCR and/or television (TV) set. These typical copy protection signals cause the VCR and TV set to sense a false sync signal due at least in part to the lowered video gain. Such signals will for instance cause the TV set to scan an illegal copy of the video signal improperly by either pre scanning and/or post scanning the video horizontal lines. Also, the VCR or TV set may develop extra or erroneous color burst sample pulses in an illegal copy.

Such typical copy protection signals thus may also contain various signals to enhance the copy protection effect such as end of line signals, end of field signals, post pseudo sync and pre pseudo sync signals, etc. Descriptions of the above mentioned signal attenuating copy protection processes are found in, for example, U.S. Pat. No. 4,631,603 issued Dec. 23, 1986 to Ryan, U.S. Pat. No. 4,918,098 issued Apr. 4, 1989 to Ryan, and U.S. Pat. No. 4,163,253 issued Jul. 31, 1979 to Morio et al., all incorporated by reference herein.

It is common practice for color videotape recorders to utilize the color burst component of a video signal to generate velocity error-correction signals to compensate for the inevitable fluctuations of the head to tape velocity. The velocity error corrector circuit in a video-tape recorder measures the phase of the color burst signal on a line-by-line basis. Any variation of phase is assumed to be due to head to tape velocity errors, and a correction signal is generated. The correction signal alters the phase of the chrominance signal in an attempt to eliminate these errors.

In accordance with a copy protection technique disclosed in U.S. Pat. No. 4,577,216 ('216) issued Mar. 18, 1986 to Ryan and known as the "Colorstripe™" copy protection process or system, (and incorporated by reference herein), deliberate phase errors are introduced into the color burst signal by phase modulating the color burst signal with a noise signal to produce "Colorstripe bursts" of incorrect phase.

The velocity error correction circuit in the videotape recorder (VCR) accordingly will attempt to eliminate the deliberate phase errors introduced. In so doing, the velocity error correction circuit will transfer the error from the color burst to the chrominance signal, thus giving rise to color noise or error in the viewed picture reproduced from the videotape recording. However, the characteristics of the modified color burst signal are such that the phase modulation is ignored by a television receiver, i.e., TV set, which produces a substantially normal color picture.

The term Colorstripe is a trademark of Macrovision Corporation, Sunnyvale, Calif. However, to facilitate the description, a variation of the term is used herein after, namely, "color stripe", or "color stripe burst" to indicate a correspondingly modified normal color burst.

The color stripe process has a disadvantage in that the color stripe signal cannot be recorded onto a video tape without causing a "playability" problem when the recorded tape is viewed upon reproduction. That is, the color stripe signal can be used successfully in a video signal transmission environment such as cable, broadcast television or as an add on signal to a digital video disk (DVD) player, but cannot be included in a prerecorded videotape environment without degrading the playability of the prerecorded tape. "Playability" is an expression indicative of the (degree of success of) viewing of a video signal containing an anti-copy protection (ACP) process when the protected video signal is applied directly to a TV set.

Accordingly, it would be highly desirable to provide a color burst modifying copy protection process which could be used in a prerecorded videotape environment as well as in the signal transmission and DVD player environments.

SUMMARY OF THE INVENTION

The present invention overcomes the playability problems of the prior art color stripe processes by providing a recordable color stripe process for use in videotape recorder copy protection systems (i.e., tape to tape or player to recorder), or in transmitted copy protection signal systems (i.e., cable or broadcast video or internet), or as a video copy protected signal embedded into video sources such as DVD units, consumer disk read only memory (CD ROM) units or storage devices.

To this end, in accordance with the present invention, the chroma portion of the video signal is further distorted when viewed during reproduction of an illegal copy. In previous prior art processes such as for example shown in the '216 patent of previous mention, the color burst is modified generally in the "normal" color burst area. In the present invention, incorrect color burst signals are added in non-normal areas such as the sync signal area as well as after the period of normal color burst. In addition, the actual normal sync signal width may be modified or shortened. The front porch breezeway also may be modified, which also allows accommodating an incorrect color burst. An "incorrect" color burst is a color burst signal in which the frequency or phase is incorrect.

The present invention is applied to a video signal in conjunction with added copy protecting pulses such as conventional pseudo sync pulses and/or AGC pulses which cause darkening in the reproduction of an illegal copy. The present invention includes by way of example one or more of the following features in various embodiments.

a) A preferably lowered end of line signal, a lowered front porch signal, and/or a pre sync signal.

b) An incorrect color burst signal in at least the sync area and its vicinity.

c) A post pseudo sync or lowered backporch portion signal.

d) A correct color signal in the nominal backporch area including optionally the post pseudo sync area.

e) An incorrect color signal after the post pseudo sync pulse.

A basis of this invention is to utilize the signals that can cause the VCR and/or TV set to generate spurious color burst sampling signals, and then put incorrect color signals in portions of the horizontal blanking interval to cause the VCR and/or TV set to incorrectly reference the incorrect color burst signal. For instance, by using a pre pseudo sync pulse such as a lowered front porch signal (for example, from blanking to −30 IRE), and an incorrect color burst signal in the sync signal area, the VCR and/or TV set will sample the incorrect color burst signal, as a result of the darkening effects of a basic copy protection signal which is already applied to the video signal. In this particular case, the TV set will scan prematurely due to the pre pseudo sync signal and the attenuated video signal, to thus cause an early horizontal flyback or burst pulse. This early flyback or burst pulse then causes the TV set to sample the burst in the sync signal area where an incorrect color burst signal has been inserted. Thus, the TV set will display further enhanced color distortions in accordance with the invention. Under normal conditions the video level is at normal levels and the horizontal sync causes the TV set to scan correctly, whereupon the flyback pulse of the TV set samples the normal color burst signal in the normal back porch area.

In another embodiment of the present invention, when a post pseudo sync signal is applied and the video signal is reduced, the post pseudo sync signal is sensed by the VCR and/or TV set, which can cause a color burst sampling signal to appear after the post pseudo sync signal. When an incorrect color burst signal is inserted after the post pseudo sync pulse signal, an incorrect color reference is sampled by the TV set and/or VCR, which causes an increase in color distortion in a reproduction of an illegal copy of the copy protected video signal.

An advantage of the invention is that the incorrect color signals generally are not sensed by the circuits when the video signal is supplied directly to a normal TV set, whereby a normal picture is displayed, whereas the prior art color stripe video copy protection signals are sensed by the TV set. Of course, the present invention may be combined with various prior art video copy protection processes including the color stripe process of previous mention, or its variations such as that using segmented color bursts.

A modified color burst comprising an incorrect color subcarrier for example, may be a waveform having a frequency which various from the color subcarrier frequency. However, the waveform may be phase, frequency, and/or amplitude modulated. One function of the incorrect color burst is to cause improper static and/or dynamic color hues. Another function of the incorrect color burst signal is to cause static and/or dynamic color saturation.

An alternative modification of the color burst signal may be achieved by varying the phase from field to field as to cause for example, color flicker within a frequency range of 1 HZ to 25 HZ.

In a further embodiment, the post pseudo sync signal is moved toward the beginning of the TV line by sensing the active video portion, to thereby maximize the extra darkening. That is, the post pseudo sync (PSTPS) signal is inserted near the beginning of the video line whenever there is a voltage level in the beginning of active video which is greater than black level. The greater than black level then behaves as an AGC pulse with respect to the post pseudo sync signal. The movement of the post pseudo sync signal can be done dynamically by sensing the video levels of the first few microseconds of the active video lines. When a gray to white level is sensed, the PSTPS signal is moved toward the beginning of the video line, i.e., to the end of the horizontal blanking interval (HBI).

Another embodiment of the invention may employ parts of the previous embodiment within certain video scrambling systems such as sync suppression scrambling systems. For example, the placement of an incorrect color burst in the sync signal area of a sync suppression system can result in increased concealment. In the case of an improved sync suppression system where blanking to predetermined levels (i.e., blanking level) of areas just outside the horizontal blanking interval, (HBI) such as the last and beginning 2 μs of the video line, the insertion of incorrect color burst in the sync signal area (i.e., at least a portion of the sync tip area, and the sync tip area and at least a portion of the back porch area), will cause more color distortions, especially when the 2 μs area of the video signal before the HBI is blanked.

Also included in the description of the present invention are various methods and/or apparatuses for at least weakening the effects of the color burst modifying process of previous discussion.

In addition, the present inventive process of modifying the front porch level and/or duration, and inserting incorrect color burst signals in the sync area and its vicinity, can also be applied to enhance the concealment effect of certain video scrambling processes such as, for example, a sync suppression scrambling process.

BRIEF DESCRIPTION OF THE DRAWINGS

FIGS. 2A, 2B and 2C are waveforms illustrating an embodiment of the invention and including color burst sample signals for normal and modified front porch levels.

DETAILED DESCRIPTION OF THE PREFERRED EMBODIMENTS

Figure 1:
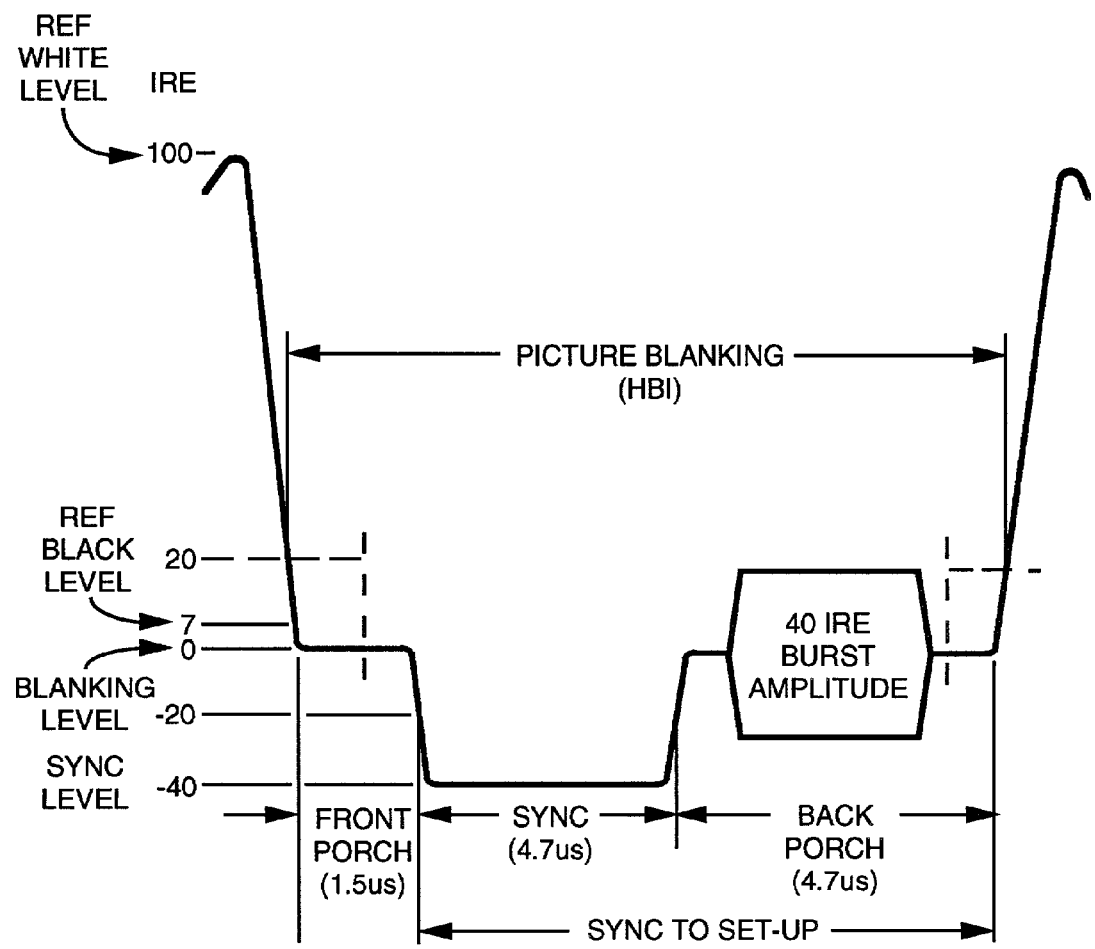
FIG. 1 is a waveform illustrating a standard unmodified horizontal blanking interval (HBI) and adjacent vicinity of lines of a video signal, identifying the various areas and the respective standard video levels, in IRE units, of the HBI.

FIG. 1 depicts by way of example a normal or standard horizontal blanking interval (HBI) in a video line of a television signal. In particular, the FIG. 1 shows the end of one line of active video and the HBI, followed by the beginning of a subsequent line of active video. The HBI includes a front porch of for example 1.5 microseconds (μs), a horizontal sync signal of 4.7 μs and a back porch of about 4.7 μs, with the front and back porches set at blanking level (zero IRE) and sync tip set at −40 IRE. Reference black level is for example +7 IRE, and a color burst signal of 40 IRE amplitude is disposed on the back porch following the sync signal.

As previously discussed, the present invention preferably requires the attenuation affects imparted to a video signal by a typical anti-copy protection (ACP) process to initiate the incorrect triggering and/or sampling in a TV set and/or VCR, to thereby cause further enhancement of the chroma distortion of the copy protected video signal in accordance with the invention.

FIG. 2A depicts a modified HBI which illustrates a first embodiment of the present invention. Here the front porch of the video signal is preferably modified to a lowered level signal, that is, provides a modified front porch (MFP) signal 18, as is depicted in dashed line. Signal MFP 18 may be lowered to a level in the range of from blanking to −30 IRE and may be of sufficient width as to cause an early scan in a TV set. When the MFP 18 is combined with a basic anticopy protection signal, and the combined signal is attenuated by the AGC amplifier of a VCR and the resulting copy is displayed on the TV set. A typical width range of MFP may be from about 1 μs to 3.5 μs. Although signal MFP 18 is preferably lowered to below blanking level, it may be dynamically varied from above blanking level to a lowered level at a selected frequency. FIGS. 2A–2C illustrate how the present invention causes an incorrect color reference in a TV and/or VCR, to thus enhance the anti-copy protection effect. As a general rule, the color burst is sampled about 5 μs after the leading edge of the normal sync signal 20. Thus, under normal conditions, that is, a substantially normal front porch level, the video signal 22 will cause the TV set and/or VCR to generate a color burst sample signal 24, FIG. 2B 5 μs after the leading edge of sync signal 20. Since sample signal 24 is coincident with a correct color burst 26 (FIG. 2A) and not an incorrect pre-color burst (PRICB) 28, the TV set and/or VCR will display and/or record or playback without the enhanced color distortion of the present invention.

On the other hand, if the video signal is reduced to lower the front porch signal, simultaneously with attenuating the video signal via for example an ACP process, the lowered front porch portion, i.e., signal MFP 18, rather than the normal sync signal 20, will be detected by at least some VCR or TV set circuits. This will generate a color burst sample signal 30, FIG. 2C, about 5 μs after the leading edge of signal MFP 18, thereby causing it to appear earlier than the normal color burst sample signal 24. Since there is an incorrect color burst subcarrier signal (PRICB 28) superimposed on the sync signal 20, signal MFP 18 thus causes a TV set and/or VCR to pick up the incorrect pre color burst signal PRICB 28 and not the correct color burst signal 26. As a result, the TV set and/or VCR will display, record or playback incorrect and distorted colors caused by the incorrect phase and/or frequency color burst signal 28, in accordance with the invention.

Figure 3A:
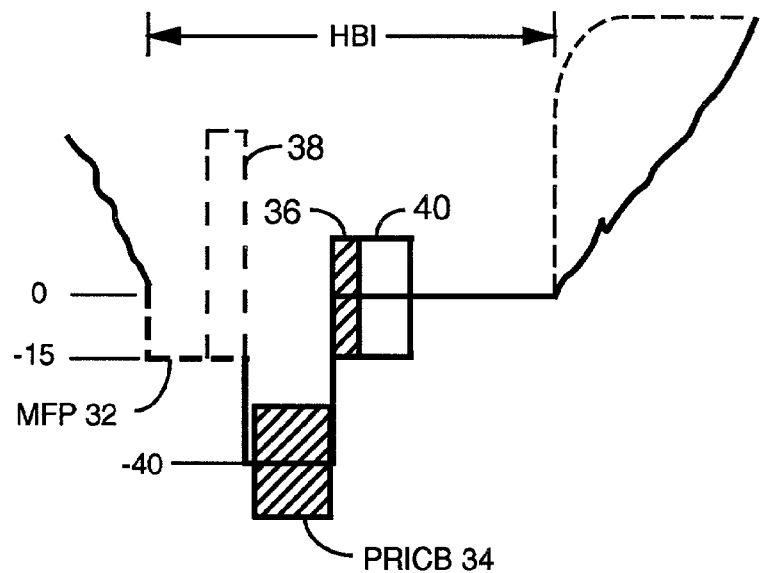
FIG. 3A is a waveform illustrating an embodiment of the present invention similar to that of FIG. 2A employing a modified (lowered) front porch (MFP) signal level but depicting further modifications.

FIG. 3A illustrates variations in the embodiment of FIG. 2A and includes a modified front porch (MFP) signal 32, shown in dashed line, an incorrect pre color burst signal PRICB 34 which may extend into the back porch area as depicted at 36, and a portion of a normal color burst 40. In a further variation, a positive going pulse 38 which approaches peak white level may be disposed on the lowered MFP signal 32, as illustrated in dashed line in FIG. 3A. The incorrect pre color burst signal 36, or signals 36 and 34, are preferably used in DVD, pay per view (PPV) etc., signal transmission environments, and may not be as desirable in a prerecorded videotape environment because the incorrect pre color burst signal 36 situated at the beginning of the back porch can cause playability problems in a VCR.

As discussed in FIGS. 2A–2C, the lowered level of the signal MFP 32 in FIG. 3A causes the color burst sample signal (30 of FIG. 2C) to sample the pre and post incorrect color burst signals 34, 36, respectively, to insure the enhanced color distortion affects in a reproduced video signal in accordance with the invention.

In a further variation of the invention, the MFP signal 32 and the positive going pulse 38 shown in dashed line in FIG. 3A, may form yet another pseudo sync/AGC pulse pair signal, preferably simultaneously with the attenuated video signal conditions caused by a combination of sync/pseudo sync/AGC pulses used to provide the ACP process for combination with the present invention to provide the enhanced color distortion, as discussed above.

Figure 3B:
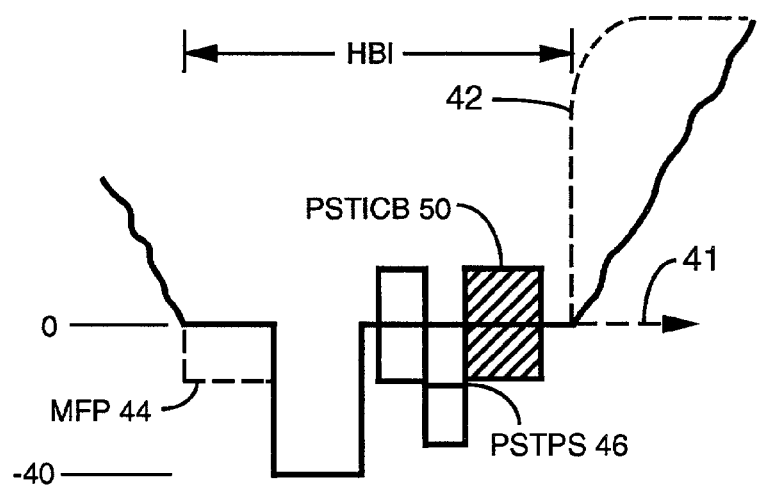
FIG. 3B is a waveform illustrating another embodiment employing a post pseudo sync (PSTPS) signal.
Figure 3C:
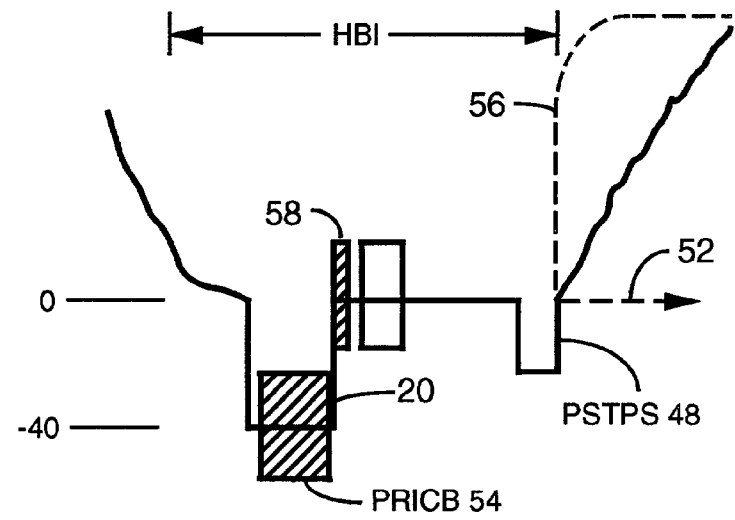
FIG. 3C is a waveform illustrating a further embodiment of the invention employing a PSTPS signal moved sufficiently close to the beginning of the active video signal to cause the active video signal to function as an AGC signal with respect to the PSTPS signal.

FIGS. 3B and 3C illustrate further embodiments of the invention employing post pseudo sync signals PSTPS 46 and 48, respectively. In FIG. 3B, the levels of a MFP signal 44 and a PSTPS signal 46 selectively are lowered to cause the TV set and/or VCR to sense an incorrect PSTICB signal 50, when the video signal simultaneously is attenuated by an ACP process as previously explained.

The false sensing caused by the MFP and PSTPS signals of for example FIGS. 3A–3C, can by themselves cause extra horizontal tearing or luminance concealment, but because there are incorrect color subcarrier signals following the MFP and PSTPS signals, such as the PRICB signal and the PSTICB signal, respectively, extra color distortions are incurred during the viewing of an illegal copy or during an attenuated video situation. Once false sampling or triggering is established, the present invention causes further, i.e. enhanced, color distortion in the TV set and/or VCR by placing incorrect color subcarrier signals in areas where the TV set and/or VCR will falsely sense or sample the incorrect color subcarrier signals under the attenuated circumstances.

FIGS. 3B, 3C illustrate specific cases of the PSTPS signals 46 and 48 positioned towards and adjacent, respectively, the beginning portions 41 and 52 of the active video line. When the signal in FIGS. 3B, 3C are combined with any copy protection process that includes an attenuation effect, the PSTPS signals 46, 48 are sensed as a sync or pseudo sync signal during the playback of an illegal copy. When the level at the beginning portion 41 or 52 of the active video line is greater than black or blanking level (as depicted in dashed line at 42 [FIG. 3B] and at 56 [FIG. 3C]), the PSTPS signal 46 and/or signal 48 will form a pulse pair situation of post pseudo sync and AGC pulses due to the non black level at the beginning portion 41 or portion 52 of the video lines of FIG. 3B or 3C, that then causes further attenuation or darkening of the illegal copy when viewed. This further darkening will be dynamic since the beginning portion 52 of the video line varies in signal levels according to the program content.

In a further embodiment, the position of the PSTPS signals 46, 48 may be alternated/varied from the positions shown in FIGS. 3B, 3C in an adaptive manner as well. For instance the position of the PSTPS signal 48 in FIG. 3C may be determined when a minimum gray to white level is sensed at the beginning portion 52 of the video line during the program video. Also shown is a PRICB signal 54, an incorrect burst signal that can reside in the sync signal portion and/or in a portion 58 of the back porch area, as earlier depicted in FIG. 3A.

The embodiments of FIGS. 2A and 3A–3C illustrate examples of the invention where at least a portion of the front porch, and/or at least a portion of the end of the active video line, and/or at least a portion of the back porch, are replaced by a signal near or below blanking. Typically, this signal may be about −10 IRE to −20 or −30 IRE, or varied through a range of for example from a few IRE above zero to −30 IRE at some selected fixed or random frequency, for selected lines of the video field.

In addition, it should be noted that in this invention, the horizontal blanking interval may be varied from its normal duration. For instance, the typical duration of the horizontal blanking interval, HBI, is normally about 10.9 microseconds for the NTSC color standard. For this embodiment, the HBI preferably may be expanded to 12 μs by extending the HBI into the end of the active video line one or more microseconds.

Figure 3D:
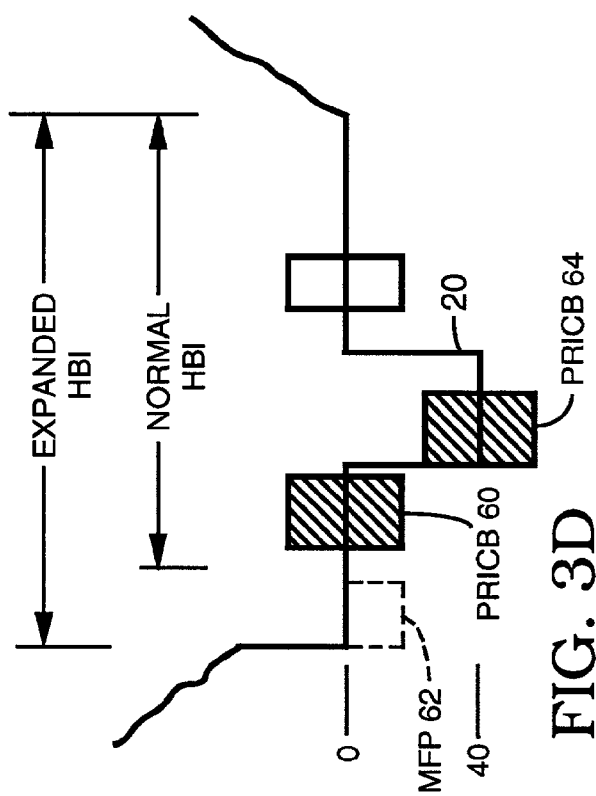
FIG. 3D is a waveform of a further embodiment of the invention wherein an incorrect color burst is added in the front porch area of an expanded HBI.

To this end, FIG. 3D depicts an expanded HBI which allows for extra cycles of incorrect color burst PSTICB to be inserted after a PSTPS signal (for example, PSTPS signal 46 and PSTICB 50, FIG. 3B) for increased concealment or color distortion in a viewed illegal copy. In addition, the expanded HBI allows for the lowered front porch area to cause an earlier pre scan for increased concealment, while also allowing for better playability because an incorrect color signal PRICB 60 can now reside on a lowered front porch area MFP 62 and/or the first half of the sync tip as depicted as PRICB 64.

Figure 4:
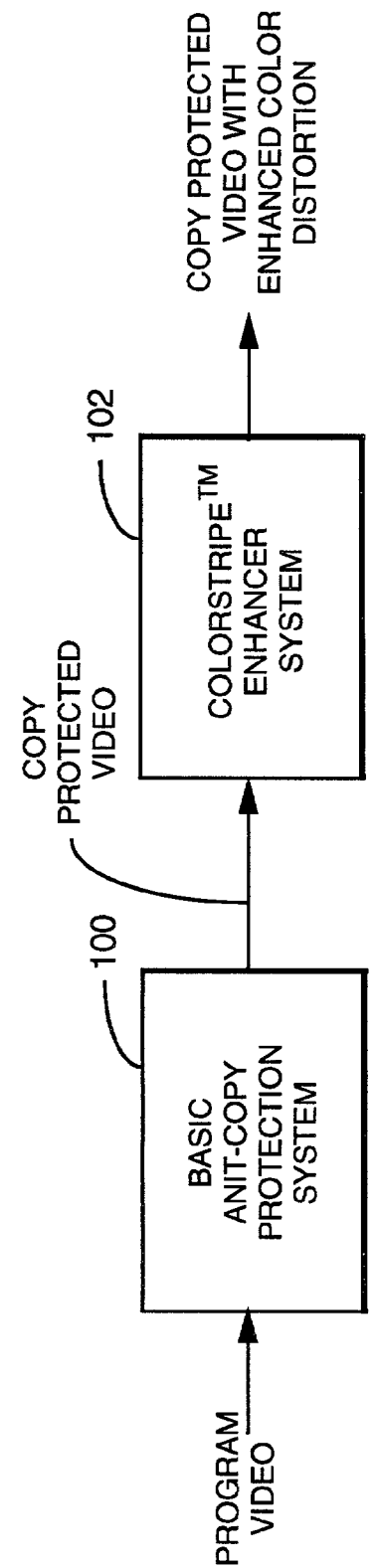
FIG. 4 is a block diagram illustrating the present invention in an exemplary environment.

FIG. 4 illustrates a system level block diagram including the present invention. Program video is supplied to a basic anti-copy protection (ACP) system 100 that causes darkening or attenuation when an illegal copy is played back and viewed. The output of the basic copy protection system 100 is applied to the process of the invention, namely a color stripe enhancer system 102. The output of the color stripe enhancer system 102 is a copy protection video signal with enhanced color distortion, which is then supplied to typically a duplicating VCR. When an illegal copy is made from the processes illustrated in FIG. 4, the resulting playback and display of the recorded video signal will be darkened video caused by the basic anti-copy protection process, combined with the enhanced color distortions caused by the present invention (system 102). Further darkening can also result by aligning the PSTPS signal to the position near the beginning portion of the program's active video lines that are above blanking level, as discussed in FIG. 3C.

Figure 5:
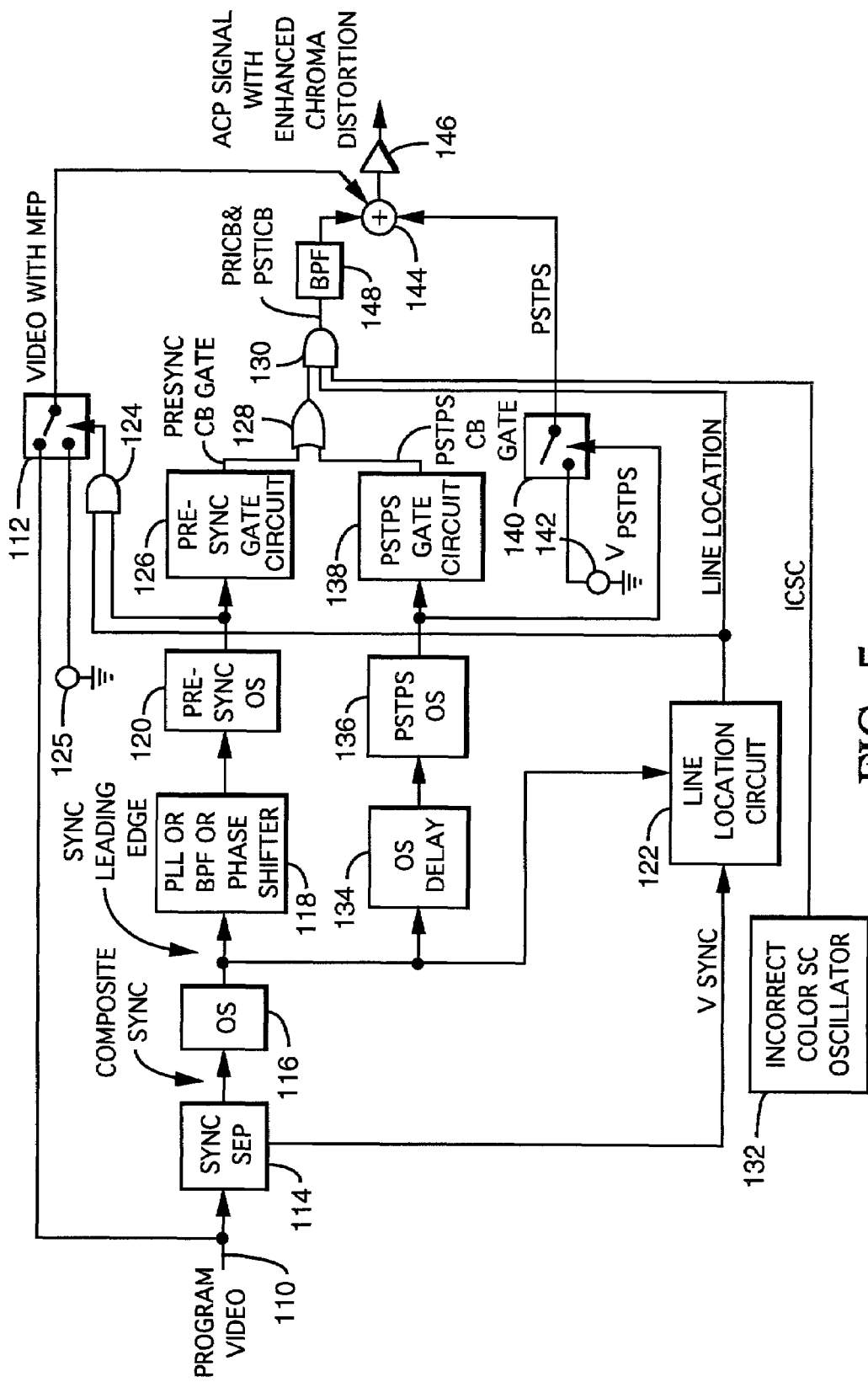
FIG. 5 is a block diagram illustrating circuitry of the present invention for generating the modified waveforms of for example FIGS. 2B–2C and 3A–3D.

Referring to the block diagram of FIG. 5, a normal HBI duration is assumed and the video input signal is a program video signal that preferably contains a basic anti-copy protection signal that causes attenuation in an AGC system such as the AGC system in a VCR. Some examples of the basic anti-copy protection signals are described for example in the patents of previous mention by Ryan '603, Morio '253, and Ryan '098. With certain applications (preferably video player and transmission systems) the invention can include the basic copy protection signal in combination with a color stripe signal process as disclosed in Ryan '216 or a modified attenuated effects color stripe signal as disclosed in U.S. Pat. No. 5,784,523 to Quan ('523).

In FIG. 5, the program video signal with ACP on input 110 is assumed to be clamped at blanking level or about zero volt, and is coupled to a switch 112 and a sync separator circuit 114. One output of the circuit 114 then is supplied to a one shot 116. One shot 116 is non retriggerable and is set to greater than about 32 μs so that its output is a horizontal rate pulse. The output of one shot 116 is then a horizontal rate pulse with its leading edge coincident with the leading edge of the horizontal sync of the input program video signal. The one shot 116 is coupled to a circuit 118 which may comprise a horizontal frequency phase lock loop, a horizontal frequency bandpass filter or a phase shifter, which generates a pulse prior to the occurrence of the leading edge of the horizontal sync. The output of the circuit 118 is thus a signal that has a phase lead with respect to the incoming horizontal sync, and is supplied to a pre sync one shot 120. The output of one shot 120 occurs then a selected duration before the leading edge of the incoming horizontal sync, typically about 2 μs to 3.5 μs. Thus the output of the one shot 120 is a logic high pulse during for example the MFP signals 32, 44, 62 in FIGS. 3A, 3B, 3D.

The output of one shot 120 is logically ANDed with a line location signal from a circuit 122 via an AND circuit 124. Line location circuit 122 is supplied a vertical sync signal from separator circuit 114. The output of AND circuit 124 is logic high during selected lines and selected portions of the video field. For example from lines 21 to 250 there are pulses of about 2.5 μs before a leading edge of incoming horizontal sync. The output of AND circuit 124 turns on the switch 112 to thereby insert an MFP signal of selected (generally lowered) level from a voltage source 125 in the incoming video signal. Thus the output of switch 112 is normally the input program video with a preselected modified front porch area of a selected level, Vpresync. The video signal may include an HB1 of expanded duration. Vpresync can be a fixed voltage of about blanking level or lower than blanking level.

Figure 7:
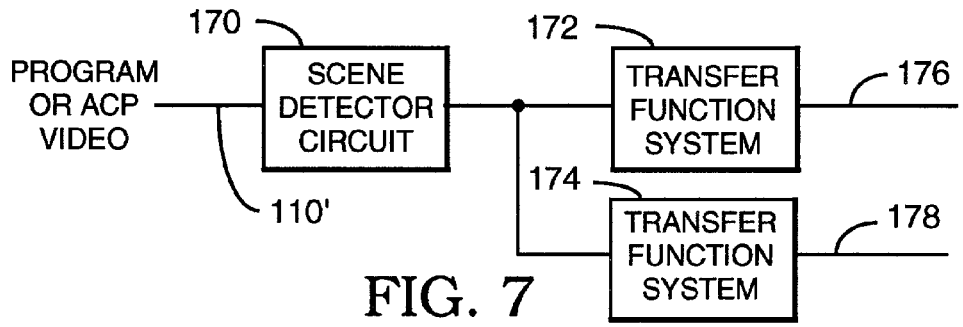
FIG. 7 is a block diagram illustrating another embodiment of the present invention.
Figure 8:
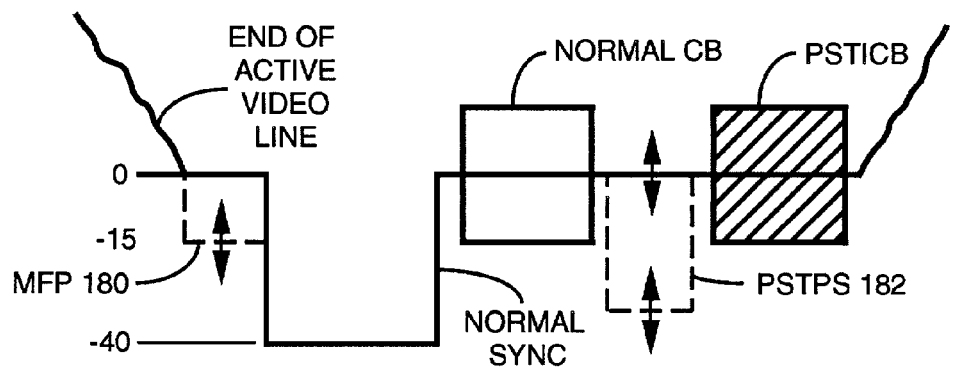
FIG. 8 is a waveform illustrating the signals provided by the circuits of FIGS. 7 and 9.
Figure 9:
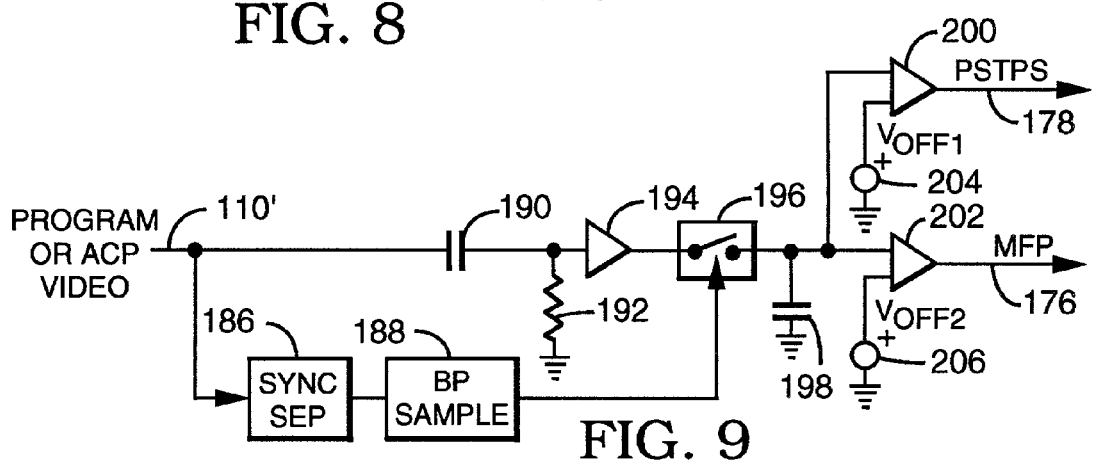
FIG. 9 is a schematic diagram illustrating further details of the block diagram of FIG. 7.

On the other hand, Vpresync can vary as a function of scene content, that is, average picture level (APL), as described for example in FIGS. 7–9. For example, Vpresync may assume the approximate values: 0 IRE to +10 IRE for bright scenes, about −5 IRE for average gray scenes, and about −10 IRE for dark scenes.

A presync color burst gate signal is generated by a presync gate circuit 126 following the trailing edge of the pulse of the one shot 120. The output of gate circuit 126 is a presync pulse that will provide for inserting a color burst (correct or otherwise) in the sync area and/or before the color burst of the input program video signal. The output of the gate circuit 126 is coupled to an OR gate 128. The other input of OR gate 128 is another color burst gate pulse (for example a PSTPS burst gate) in the back porch interval to allow adding or inserting a color burst (correct or otherwise) in a back porch portion of the HB1. Thus the output of OR gate 128 is a series of pulses coincident within the horizontal blanking interval, which when selectively ANDed via an AND gate 130, with the line location signal from the line location circuit 122 and an incorrect color subcarrier signal from an oscillator 132, causes the insertion of incorrect (or otherwise) color burst phase or frequency signals into the horizontal blanking interval at corresponding various locations.

In the generation of the PSTPS color burst gate, a one shot delay 134 is triggered by the leading edge of sync supplied by the one shot 116. Then a one shot 136 coupled to one shot 134 provides a logic high pulse to a postsync gate circuit 138, whose output is supplied to the OR gate 128 as the PSTPS color burst gate signal. The presync and postsync gate circuits 126, 138, respectively, may comprise timing circuits such as one shot circuits.

An output signal from the one shot 136, a logic high pulse in a back porch portion, is used to control a switch 140 to cause the level of a back porch portion to go below normal blanking level. This lowered back porch portion corresponding to the PSTPS signals of previous mention, is set by a signal voltage $V_{PSTPS}$ from a voltage source 142.

A summing circuit 144 then produces a modified video signal with basic copy protection with preferably incorrect burst in various locations of the horizontal blanking interval. That is, the modified video signal may include an incorrect burst in the MFP signal area (FIG. 3D), in the portion of the sync area as for example shown in FIGS. 3A, 3C, 3D, or an incorrect burst in the back porch portion preferably after the trailing edge of the PSTPS signal as shown for example in FIG. 3B. Also the output of summing circuit 144 may include a lowered back porch portion or PSTPS signal (see FIG. 3B).

The results of the circuits of FIG. 5 are exemplified in FIG. 3A where the MFP signal 32 is realized by the output of the voltage source 125 and switch 112, and the PRICB signal 34 is realized by the circuits 132, 126, 128, 130, 148 and 144.

Referring to FIG. 3B the PSTPS signal 46 is realized by the circuits 136, 140, 142 and 144. Also in FIG. 3B, the incorrect color burst PSTICB signal 50 following a PSTPS signal, is realized by the circuits 132, 138, 128, 130, 148 and 144.

FIG. 3C illustrates the situation where the PSTPS signal 48 is moved or inserted near the beginning of the active video line to cause a VCR to further attenuate the signal once the basic anti-copy protection signals take affect. Also the PSTPS signal 48 in FIG. 3C can cause the TV set to have less viewability because under attenuated circumstances from the VCR (directly or from a copy), the PSTPS signal may cause a TV to generate an incorrect horizontal sync signal.

Figure 6:
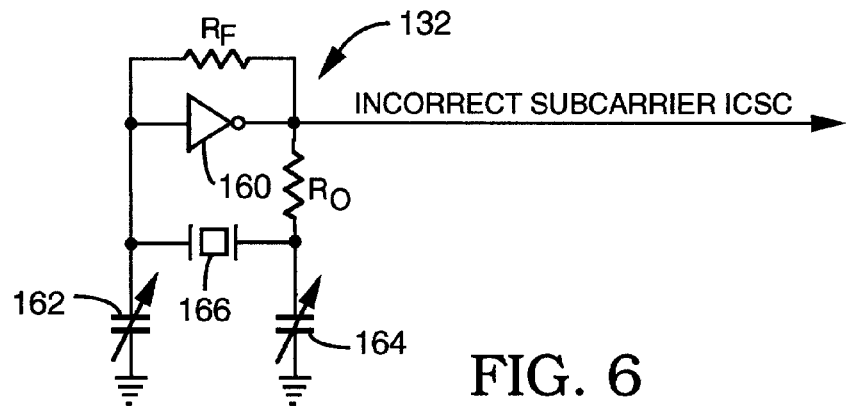
FIG. 6 is a schematic diagram illustrating an incorrect subcarrier generator circuit.

FIG. 6 illustrates by way of example an implementation of an incorrect color subcarrier oscillator circuit, such as the oscillator 132 of FIG. 5. To this end, an inverting amplifier 160 is coupled at its input to an adjustable capacitor 162 and thence to ground. The output of the amplifier 160 is coupled to another adjustable capacitor 164 and thence to ground via a resistor Ro. A crystal oscillator 166 and a resistor $R_f$ are coupled across the amplifier 160. By adjusting the capacitors C10 and/or C20 electronically or manually, the phase and frequency generated by the oscillator 132 changes thus providing an incorrect color subcarrier signal ICSC rather than the nominal frequency which normally is NTSC or PAL color subcarrier frequency. It should be noted that the circuit in FIG. 6 is generally not locked with the video subcarrier frequency but may be locked in phase with the incoming video subcarrier but with a phase offset or variable phase offset.

Adaptively changing the MFP and/or PSTPS signal's negative or low levels in a video signal may be preferable in certain situations where maximum playability is desired. To this end, FIG. 7 illustrates a technique of the invention for adaptively changing the levels of the modified front porch area (MFP) and/or end of the active video line, and also for adaptively modifying the PSTPS amplitude or post pseudo sync tip level. Here the program video or copy protected video is supplied on input 110' to a scene detector circuit 170, whose output is supplied to a transfer function system 172 and/or 174, such as look up tables or some type of scene to voltage transformation circuit. The output terminal of system 172 then supplies a voltage source on output 176 and the output terminal of system 174 supplies a voltage source on output 178.

FIG. 8 illustrates via a waveform, adaptively varying the post pseudo sync amplitude and/or tip level, as well as the level of the MFP and/or end of the active video line, in accordance with the present invention. Thus the MFP signal indicated at 180 may vary in level as depicted in dashed line and the vertical arrow, in response to a signal indicative of the average picture level (APL). Likewise, the PSTPS signal indicated at 182 may be varied in amplitude and/or tip level as depicted in dashed line and vertical arrows, in response to the detected APL of the video signal.

To this end, FIG. 9 is a schematic diagram, illustrating by way of example only, further detailed circuitry of the block diagram of FIG. 7. Here the program or ACP video signal on input 110' is coupled to a sync separator circuit 186 whose output is coupled to a back porch sample circuit 188 which generates a pulse coincident with a substantially normal blanking level, thereby avoiding sampling in an area of substantially modified level in a back porch portion. The video signal on input 110' also is AC coupled via a capacitor 190 and a grounded resistor 192, whereby the absolute values of the unmodified back porch area levels will change in relationship to the average picture level. On bright scenes, the unmodified back porch level measured at an output of a buffer amplifier 194 will go below zero volt. On dark scenes, the unmodified back porch level measured at the output will be about zero volt. An unmodified back porch area is sampled via a switch 196 and storage capacitor 198, which thus generate a voltage indicative of the average picture level. This voltage is then supplied to amplifiers 200 and 202, each of which can have a different voltage gain. Coupled to a second input of amplifier 200 is an offset voltage Voff1 from a voltage source 204, and coupled to a second input of the amplifier 202 is another offset voltage Voff2 from a voltage source 206. An output 176 of amplifier 202 comprises the MFP signal corresponding for example, to the voltage Voff2, and will preferably generate a negative voltage for dark scenes and preferably no voltage for bright scenes. An output 178 of amplifier 200 comprises the PSTPS signal corresponding for example to the voltage Voff1, and the gain of the amplifier 200 is selected to range from a preferable negative voltage during bright scenes to a preferably more negative voltage for dark scenes. The output voltages on the outputs 176 and 178 of FIGS. 7 and 9 thus correspond to one another.

While a preferred embodiment uses standard horizontal blanking intervals and/or sync widths and/or color envelope durations, other embodiments of the invention contemplate implementing the horizontal blanking intervals and/or syncs and/or color envelope durations with non-standard intervals and durations. For instance, the horizontal sync may be narrowed and/or delayed and/or the horizontal blanking interval may be widened or narrowed.

Accordingly, various such modifications and adaptations of the embodiments and examples of the invention will be apparent from the description and drawings, and thus the scope of the invention is defined by the attached claims and their equivalents.

What is claimed is:

1. A method of synthesizing at least part of a copy protection signal in a video signal wherein the video signal includes video lines having horizontal blanking intervals including horizontal sync, front porch and back porch areas of respective normal levels, and a normal color burst area, comprising:

lowering the level of a selected portion or portions of the end of a video line and or of the horizontal blanking interval to a value lower than said respective normal level of the selected portion or portions;

inserting a color burst signal of incorrect phase or frequency in a second portion of the horizontal blanking interval; and wherein the second portion is spatially arranged in respect of the selected portion or portions such that an attenuation and or darkening effect caused by a basic copy protection signal causes a recorder or television set to sense the lowered portion or portions to cause the recorder or television set to sample or sense the incorrect color burst signal thereby generating color distortion in the recorder or television set;

wherein the incorrect color burst signal is added to at least a portion of the horizontal sync signal and/or to at least a portion of the back porch area so as to enable the sampling or sensing of the incorrect color burst signal; and or wherein the incorrect color burst signal is added to at least a portion of a horizontal sync pulse, and the selected portion which is lowered in level is in at least a portion of the front porch area or in a portion of the active video toward the end of a video line.

2. A method of synthesizing at least part of a copy protection signal in a video signal wherein the video signal includes video lines having horizontal blanking intervals including horizontal sync, front porch and back porch areas of respective normal levels, and a normal color burst area, comprising:

lowering the level of a selected portion or portions of the end of a video line and or of the horizontal blanking interval to a value lower than said respective normal level of the selected portion or portions;

inserting a color burst signal of incorrect phase or frequency in a second portion of the horizontal blanking interval;

wherein the second portion is spatially arranged in respect of the selected portion or portions such that an attenuation and or darkening effect caused by a basic copy protection signal causes a recorder or television set to sense the lowered portion or portions to cause the recorder or television set to sample or sense the incorrect color burst signal thereby generating color distortion in the recorder or television set;

wherein the incorrect color burst signal is added to at least a portion of the horizontal sync signal and/or to at least a portion of the back porch area so as to enable the sampling or sensing of the incorrect color burst signal; and further including;

superimposing a positive pulse on the front porch area prior to the horizontal sync signal;

wherein the selected signal which is lowered in level is a portion of the front porch area; and wherein the lowered front porch portion and the positive pulse form a pseudo sync/automatic gain control (AGC) pulse pair.

3. A method of synthesizing at least part of a copy protection signal in a video signal wherein the video signal includes video lines having horizontal blanking intervals including horizontal sync, front porch and back porch areas of respective normal levels, and a normal color burst area, comprising:

lowering the level of a selected portion or portions of the end of a video line and or of the horizontal blanking interval to a value lower than said respective normal level of the selected portion or portions;

inserting a color burst signal of incorrect phase or frequency in a second portion of the horizontal blanking interval;

wherein the second portion is spatially arranged in respect of the selected portion or portions such that an attenuation and or darkening effect caused by a basic copy protection signal causes a recorder or television set to sense the lowered portion or portions to cause the recorder or television set to sample or sense the incorrect color burst signal thereby generating color distortion in the recorder or television set;

wherein the incorrect color burst signal is added to at least a portion of the horizontal sync signal and/or to at least a portion of the back porch area so as to enable the sampling or sensing of the incorrect color burst signal; and wherein the selected portion which is lowered in level comprises the end of a video line and or at least a part of the front porch area.

4. A method of synthesizing at least part of a copy protection signal in a video signal wherein the video signal includes video lines having horizontal blanking intervals including horizontal sync, front porch and back porch areas of respective normal levels, and a normal color burst area, comprising:

lowering the level of a selected portion or portions of the end of a video line and or of the horizontal blanking interval to a value lower than said respective normal level of the selected portion or portions;

inserting a color burst signal of incorrect phase or frequency in a second portion of the horizontal blanking interval;

wherein the second portion is spatially arranged in respect of the selected portion or portions such that an attenuation and or darkening effect caused by a basic copy protection signal causes a recorder or television set to sense the lowered portion or portions to cause the recorder or television set to sample or sense the incorrect color burst signal thereby generating color distortion in the recorder or television set;

wherein the incorrect color burst signal is added to at least a portion of the horizontal sync signal and/or to at least a portion of the back porch area so as to enable the sampling or sensing of the incorrect color burst signal; and further including;

generating an average picture level (APL) signal indicative of the instant average picture level; and varying the amount that the selected portion is lowered in response to the APL signal.

5. The method of claim 4 wherein the level of a portion of the front porch area or of the end of a video line is varied in response to the APL signal.

6. The method of claim 4 wherein the level of a post pseudo sync signal added to a back porch area is varied in response to the APL signal.

7. A method of synthesizing at least a part of a copy protection signal in a video signal wherein the video signal includes video lines having horizontal blanking intervals, comprising:

lowering the normal level of a portion or portions of the end of the video line and or of the horizontal blanking interval prior to the horizontal sync to cause an erroneous early scan of the video line;

adding a color burst of incorrect phase or frequency to the horizontal sync following the lowered portion or portions; and causing a recorder or television set to sample or sense the lowered portion or portions to cause the sampling or sensing of the incorrect color burst in response to the erroneous early scan, thereby generating color distortion in the recorder or television set;

wherein the portion which is lowered in level comprises a portion of a front porch.

8. The method of claim 7 including:

adding a positive pulse to the front porch prior to the horizontal sync, wherein the lowered front porch portion and the positive pulse form a pseudo sync/automatic gain control (AGC) pulse pair.

9. The method of claim 7 wherein the incorrect color burst also is added to a first portion of the back porch prior to a color burst.

10. A method of synthesizing at least a part of a copy protection signal in a video signal wherein the video signal includes video lines having horizontal blanking intervals with normal levels of front porch and back porch and a normal color burst area, comprising:

lowering a portion or portions of the horizontal blanking interval prior to the horizontal sync to cause an erroneous early scan of selected video lines;

adding a color burst of incorrect phase or frequency to the horizontal sync;

lowering a portion or portions of the back porch following the normal color burst to define a pseudo horizontal sync to cause an erroneous late scan of selected video lines;

adding a color burst of incorrect phase or frequency to the back porch following the pseudo horizontal sync;

determining the average picture level of a field of the video lines;

adjusting the lowered levels of the portion or portions of the horizontal blanking level and or of the pseudo horizontal sync in response to the average picture level; and thereby causing a recorder or television set to sample or sense the respective incorrect color burst in response to the erroneous early scan or the erroneous late scan depending upon the average picture level and the correspondingly adjusted lowered levels.

11. Apparatus for synthesizing at least a part of a copy protection signal in a video signal during reproduction of an illegal copy, wherein the video signal includes video lines having horizontal blanking intervals with normal levels of front porch and back porch and a normal color burst area, comprising:

circuitry for lowering the level of a selected portion or portions of the end of a video line and or of a horizontal blanking interval to below the normal level;

generator/combining circuits for supplying a color burst of incorrect phase or frequency in a further portion of the horizontal blanking interval;

wherein said further portion is positioned in respect of the selected portion or portions such that an attenuation and or darkening effect caused by a basic copy protection signal causes a recorder or television set to sense the lowered portion or portions to cause the recorder or television set to sample or sense the incorrect color burst, thereby generating color distortion in the recorder or television set; and wherein the circuitry include a first voltage source for lowering the normal level of a portion of the front porch to provide a modified front porch signal.

12. The apparatus of claim 11 wherein the circuitry further include:

a second voltage source for providing a post pseudo sync signal of lowered level during an area of a back porch.

13. Apparatus for synthesizing at least a part of a copy protection signal in a video signal during reproduction of an illegal copy, wherein the video signal includes video lines having horizontal blanking intervals with normal levels of front porch and back porch and a normal color burst area, comprising:

circuitry for lowering the level of a selected portion or portions of the end of a video line and or of a horizontal blanking interval to below the normal level;

generator/combining circuits for supplying a color burst of incorrect phase or frequency in a further portion of the horizontal blanking interval;

wherein said further portion is positioned in respect of the selected portion or portions such that an attenuation and or darkening effect caused by a basic copy protection signal causes a recorder or television set to sense the lowered portion or portions to cause the recorder or television set to sample or sense the incorrect color burst, thereby generating color distortion in the recorder or television set;

including a gate logic circuit responsive to selected sync signals for also producing pre sync and or post sync color burst gate signals; and wherein the generator/combining circuits include;

an oscillator or generator for supplying signals of the incorrect phase or frequency; and a combining circuit for combining with the video signal, selected signals of a modified front porch, the end of a video line, the post pseudo sync and/or the incorrect color burst in response to the pre sync and or post sync color burst gate signals, to cause the color distortion in the recorder or television set.

14. The apparatus of claim 13 wherein the gate logic circuit include:

a pulse generating circuit for providing a sync related signal in response to the sync signals;

a first timing circuit responsive to the sync related signal for providing the pre sync color burst gate signal;

a second timing circuit responsive to the sync signals for providing the post sync color burst gate signal; and wherein the combining circuit includes logic circuits responsive to the first and second timing circuits and the oscillator for providing pre sync color burst and post sync color burst signals of the incorrect phase or frequency as determined by the pre sync and post sync color burst gate signals, respectively.

15. The apparatus of claim 14 wherein the first timing circuit includes the pulse generating circuit for providing the sync related signal, a third timing circuit and a pre sync gate circuit for providing the pre sync color burst gate signal.

16. The apparatus of claim 14 wherein the second timing circuit includes a pair of one shots, and a post sync gate circuit for providing the post sync color burst gate signal.

17. The apparatus of claim 16 wherein the means for providing a post pseudo sync signal include:

a switch;

a second voltage source coupled to an input of the switch; and the switch being responsive to the pair of one shots for providing the post pseudo sync signal following the normal color burst on the back porch.

18. Apparatus for synthesizing at least a part of a copy protection signal in a video signal during reproduction of an illegal copy, wherein the video signal includes video lines having horizontal blanking intervals with normal levels of front porch and back porch and a normal color burst area comprising:

circuitry for lowering the level of a selected portion or portions of the end of a video line and or of a horizontal blanking interval to below the normal level;

generator/combining circuits for supplying a color burst of incorrect phase or frequency in a further portion of the horizontal blanking interval;

wherein said further portion is positioned in respect of the selected portion or portions such that an attenuation and or darkening effect caused by a basic copy protection signal causes a recorder or television set to sense the lowered portion or portions to cause the recorder or television set to sample or sense the incorrect color burst thereby generating color distortion in the recorder or television set;

including a gate logic circuit responsive to selected sync signals for also producing pre sync and or post sync color burst gate signals; and wherein the combining circuit includes;

an AND gate receiving the pre sync and post sync color burst gate signals, the incorrect color burst signal and a line location signal;

a filter coupled to the AND gate; and a summing circuit receiving the modified front porch signal, the signals from the filter and the post pseudo sync signal, for outputting the combined signals so as to cause the color distortion.

19. The apparatus of claim 18 wherein the circuitry include:

a switch receiving the video signal at a first input;

a first voltage source for providing a lowered voltage level coupled to a second input of the switch;

a gate circuit for producing a pre sync color burst gate signal; and said switch being responsive to the line location signal and the pre sync color burst gate signal to insert the lowered voltage level into the video signal during the front porch.

20. Apparatus for synthesizing at least a part of a copy protection signal in a video signal during reproduction of an illegal copy, wherein the video signal includes video lines having horizontal blanking intervals with normal levels of front porch and back porch and a normal color burst area, comprising:

circuitry for lowering the level of a selected portion or portions of the end of a video line and or of a horizontal blanking interval to below the normal level;

generator/combining circuits for supplying a color burst of incorrect phase or frequency in a further portion of the horizontal blanking interval;

wherein said further portion is positioned in respect of the selected portion or portions such that an attenuation and or darkening effect caused by a basic copy protection signal causes a recorder or television set to sense the lowered portion or portions to cause the recorder or television set to sample or sense the incorrect color burst, thereby generating color distortion in the recorder or television set; and further including;

a timing circuit for generating a horizontal blanking interval of expanded duration; and wherein the gate logic circuit includes a timing circuit for inserting an incorrect color burst in a portion of the front porch prior to the horizontal sync.

21. Apparatus for synthesizing at least a part of a copy protection signal in a video signal during reproduction of an illegal copy, wherein the video signal includes video lines having horizontal blanking intervals with normal levels of front porch and back porch and a normal color burst area, comprising:

circuitry for lowering the level of a selected portion or portions of the end of a video line and or of a horizontal blanking interval to below the normal level;

generator/combining circuits for supplying a color burst of incorrect phase or frequency in a further portion of the horizontal blanking interval;

wherein said further portion is positioned in respect of the selected portion or portions such that an attenuation and or darkening effect caused by a basic copy protection signal causes a recorder or television set to sense the lowered portion or portions to cause the recorder or television set to sample or sense the incorrect color burst, thereby generating color distortion in the recorder or television set; and wherein the circuitry for lowering the level further include;

a scene detector circuit receiving the video signal for determining the average picture level; and transfer function circuits responsive to the determined average picture level for providing one or more voltages during the selected portion of the horizontal blanking interval, which voltages vary in level in accordance with the average picture level while providing the lowered level of the selected portion.

22. The apparatus of claim 21 wherein the scene detector circuit includes:

an AC coupling circuit receiving the video signal for generating an unmodified back porch; and a sample/hold circuit for sampling the unmodified back porch to supply the average picture level to the transfer function circuits.

23. The apparatus of claim 21 wherein transfer function circuits include:

at least one amplifier having a first input receiving the determined average picture level; and an offset voltage source coupled to a second input of the respective amplifier, wherein the amplifier provides the lowered level for the selected portion or further portion in response to the determined average picture level.

24. A method of modifying a video signal to provide a copy protection effect, the video signal including video lines having horizontal blanking intervals including horizontal sync, front porch and back porch areas of respective normal levels, and a normal color burst interval, comprising:

generating a color burst signal of incorrect phase or frequency; and adding the generated incorrect color burst signal to the horizontal blanking interval before the horizontal sync and/or after the normal color burst interval;

wherein the incorrect color burst signal is added to a portion of the front porch area prior to the horizontal pulse.

25. A method of modifying a video signal to provide a copy protection or color distortion effect, the video signal including video lines having horizontal blanking intervals including horizontal sync and or front porch and back porch areas, comprising:

lowering the level of a selected portion of the end of a video line and or the front porch area prior to the horizontal sync to a value lower than the respective normal level to cause an erroneous early scan in a respective video line;

adding a color burst signal of incorrect phase or frequency to the horizontal sync and/or vicinity; and causing a recorder or television set to sample or sense the incorrect color burst signal in response to the erroneous scan, to provide the copy protection or color distortion effect.

26. The method of claim 25 including:

adding a positive pulse on the front porch area after the lowered portion and prior to the horizontal sync, wherein the lowered portion and the positive pulse form a pseudo sync/automatic gain control (AGC) pulse pair.

27. The method of claim 25 including:

generating an average picture level (APL) signal indicative of the instant average picture level; and varying the level of the lowered portion prior to the horizontal sync in response to the APL signal.

28. A method of modifying a video signal to provide a copy protection effect, the video signal including video lines having horizontal blanking intervals including horizontal sync and or front porch and back porch areas, lowering the level of a selected portion of the back porch area;

adding a color burst signal of incorrect phase or frequency to the back porch area in the vicinity of the lowered back porch portion;

providing an attenuation or darkening effect in the video signal which causes a recorder or television set to sense the lowered back porch portion thereby causing the recorder or television set to sample or sense the incorrect color burst signal in response to the lowered back porch portion, to provide the copy protection effect; and further including;

generating an average picture level (APL) signal indicative of the instant average picture level; and varying the level of the lowered back porch portion in response to the APL signal.

29. A method of modifying a video signal to provide a copy protection effect, the video signal including video lines having horizontal blanking intervals including horizontal sync and or front porch and back porch areas, comprising:

adding a basic copy protection signal to the video signal to cause an attenuation or darkening effect;

lowering the level of a selected portion or portions of the horizontal blanking interval and or the end of a video line to a value lower than said respective normal level;

inserting a color burst signal of incorrect phase or frequency in a second portion of the horizontal blanking interval;

wherein the second portion is spatially arranged in respect of the selected portion such that the attenuation or darkening effect causes the sensing of the lowered portion or portions to cause sampling or sensing the incorrect color burst signal to provide the copy protection effect; and wherein the incorrect color burst signal is added to the end of a video line, to a front porch area, to a horizontal sync signal and/or to a back porch area so as to cause the sampling of the incorrect color burst signal by a recorder or television set.

30. The method of claim 29 wherein the incorrect color burst signal is added to a portion of the horizontal sync signal, and or the selected portion which is lowered in level is in a portion of the front porch area or in the end of a video line.

31. The method of claim 29 wherein the incorrect color burst signal is added to the back porch area, and or the selected portion which is lowered in level is a pseudo sync signal inserted in a portion of the back porch area prior to the incorrect color burst signal.

32. The method of claim 29 including:

expanding the duration of the horizontal blanking interval; and inserting an incorrect color burst signal in a portion of the front porch area following the lowered level.

33. The method of claim 29 wherein:

the incorrect color burst signal is added to the horizontal sync signal, and the selected portion which is lowered in level is a pseudo sync signal on a back porch area following the incorrect color burst signal and adjacent the beginning of the respective active video line.

34. The method of claim 29 including:

superimposing a positive pulse on the front porch area prior to the horizontal sync signal; and wherein the selected signal which is lowered in level is a portion of the front porch area.

35. Apparatus for modifying a video signal to provide a copy protection effect during reproduction of an illegal copy, the video signal including video lines having horizontal blanking intervals, comprising:

circuitry for lowering the level of at least a selected portion of the horizontal blanking interval to below the normal level;

generator/combining circuits for supplying a color burst of incorrect phase or frequency in a further portion of the horizontal blanking interval;

wherein said further portion is positioned in respect of the selected portion to cause a recorder or television set to sense the lowered level of the selected portion and to thereby sample the incorrect color burst, so as to provide the copy protection effect; and wherein the circuitry include a first voltage source for lowering the normal level of a portion or portions of the front porch to provide a modified front porch signal.

36. Apparatus for modifying a video signal to provide a copy protection effect during reproduction of an illegal copy, the video signal including video lines having horizontal blanking intervals, comprising:

circuitry for lowering the level of at least a selected portion of the horizontal blanking interval to below the normal level;

generator/combining circuits for supplying a color burst of incorrect phase or frequency in a further portion of the horizontal blanking interval;

wherein said further portion is positioned in respect of the selected portion to cause a recorder or television set to sense the lowered level of the selected portion and to thereby sample the incorrect color burst, so as to provide the copy protection effect; and wherein the circuitry include a second voltage source for providing a post pseudo sync signal of lowered level during the back porch.

37. The apparatus of claim 36 wherein the second voltage source provides a post pseudo sync amplitude of about −10 to −30 IRE.

38. Apparatus for modifying a video signal to provide a copy protection effect during reproduction of an illegal copy, the video signal including video lines having horizontal blanking intervals, comprising:
- circuitry for lowering the level of at least a selected portion of the horizontal blanking interval to below the normal level;
- generator/combining circuits for supplying a color burst of incorrect phase or frequency in a further portion of the horizontal blanking interval;
- wherein said further portion is positioned in respect of the selected portion to cause a recorder or television set to sense the lowered level of the selected portion and to thereby sample the incorrect color burst rather than the normal color burst, so as to provide the copy protection effect; and
- wherein the generator/combining circuits include;
- a generator for supplying color burst signals of the incorrect phase or frequency; and
- a combining circuit for combining with the video signal, selected signals of a modified front porch, the end of a video line, the post pseudo sync signal and or the color burst in response to the incorrect pre sync and post sync color burst gate signals, to provide the copy protection effect.

39. Apparatus for modifying a video signal to provide a copy protection effect during reproduction of an illegal copy, the video signal including video lines having horizontal blanking intervals, comprising:
- circuitry for lowering the level of at least a selected portion of the horizontal blanking interval to below the normal level;
- generator/combining circuits for supplying a color burst of incorrect phase or frequency in a further portion of the horizontal blanking interval;
- wherein said further portion is positioned in respect of the selected portion to cause a recorder or television set to sense the lowered level of the selected portion and to thereby sample the incorrect color burst, so as to provide the copy protection effect; and
- wherein the circuitry for lowering the level further include;
- a scene detector circuit receiving the video signal for determining the average picture level; and
- transfer function circuits responsive to the determined average picture level for providing one or more voltages during the selected portion of the horizontal blanking interval, which voltages vary in level in accordance with the average picture level while providing the lowered level of the selected portion.

40. Apparatus for modifying a video signal to provide a copy protection effect during reproduction of an illegal copy, the video signal including video lines having horizontal blanking intervals, comprising:
- circuitry for lowering the level of at least a selected portion of the horizontal blanking interval to below the normal level;
- generator/combining circuits for supplying a color burst of incorrect phase or frequency in a further portion of the horizontal blanking interval;
- wherein said further portion is positioned in respect of the selected portion to cause a recorder or television set to sense the lowered level of the selected portion and to thereby sample the incorrect color burst, so as to provide the copy protection effect; and
- including means for adding a positive pulse on a selected portion of the front porch area and prior to the horizontal sync.

41. A method of synthesizing at least part of a copy protection signal in a video signal wherein the video signal includes video lines having horizontal blanking intervals including horizontal sync, front porch and back porch areas of respective normal levels, and a normal color burst area, comprising:
- lowering the level of a selected portion or portions of the end of a video line and or of the horizontal blanking interval to a value lower than said respective normal level of the selected portion or portions;
- inserting a color burst signal of incorrect phase or frequency in a second portion of the horizontal blanking interval;
- wherein the second portion is spatially arranged in respect of the selected portion or portions such that an attenuation and or darkening effect caused by a basic copy protection signal causes a recorder or television set to sense the lowered portion or portions to cause the recorder or television set to sample or sense the incorrect color burst signal thereby generating color distortion in the recorder or television set; and
- including modifying the duration of a horizontal blanking interval and or the width of a horizontal sync signal.

42. A method of modifying a video signal to provide a copy protection or color distortion effect, the video signal including video lines having horizontal blanking intervals including horizontal sync and or front porch and back porch areas, comprising:
- lowering the level of a selected portion of the end of a video line and or the front porch area prior to the horizontal sync to a value lower than the respective normal level to cause an erroneous early scan in a respective video line;
- adding a color burst signal of incorrect phase or frequency to the horizontal sync and/or vicinity;
- causing a recorder or television set to sample or sense the incorrect color burst signal in response to the erroneous scan, to provide the copy protection or color distortion effect; and
- further including;
- adding a basic copy protection signal to the video signal to cause an attenuation or darkening effect; and
- wherein the attenuation or darkening effect causes the recorder or television set to sense the lowered portion or portions thereby causing the sampling or sensing of the incorrect color burst.

\* \* \* \* \*